April 25, 1939.   C. R. DALE   2,155,785
CEMENT DUMP BAILER
Filed Oct. 25, 1937   2 Sheets-Sheet 1

Inventor:
Clarence R. Dale.
Attorney.

April 25, 1939.   C. R. DALE   2,155,785
CEMENT DUMP BAILER
Filed Oct. 25, 1937   2 Sheets-Sheet 2
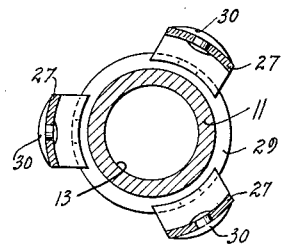
Fig. 5.
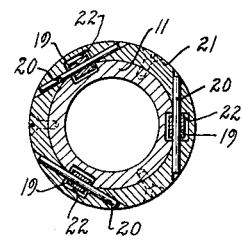
Fig. 6.
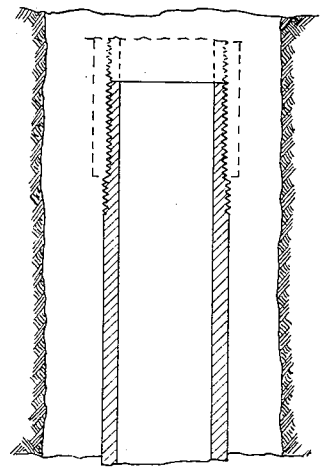
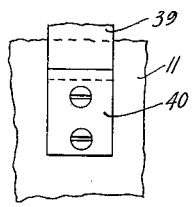
Fig. 7.
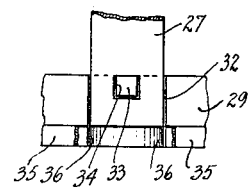
Fig. 8.
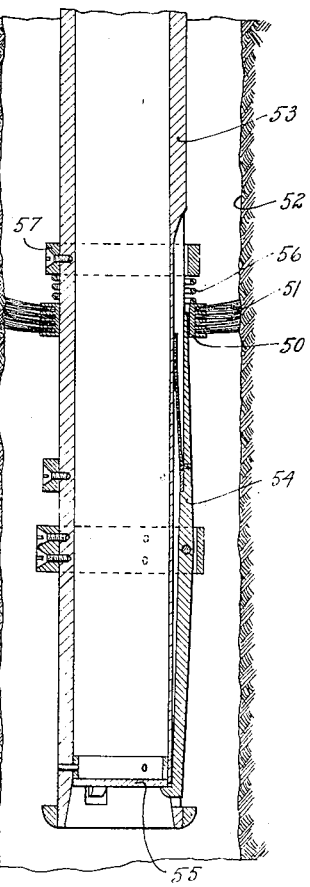
Fig. 1.
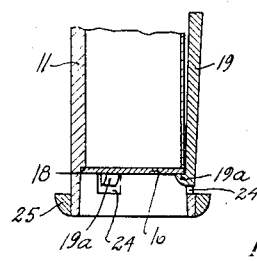
Fig. 9.
Inventor.
Clarence R. Dale.
Attorney.

Patented Apr. 25, 1939

2,155,785

UNITED STATES PATENT OFFICE 2,155,785

CEMENT DUMP BAILER

Clarence R. Dale, Los Angeles, Calif., assignor to Dale Service Corporation, Culver City, Calif., a corporation of California Application October 25, 1937, Serial No. 170,854

18 Claims. (Cl. 166—19)

This invention relates generally to dump type bailers used in oil well operations for depositing fluid or flowable material in the well. While the present bailer may be used for depositing any such materials customarily employed in well operations, it has been specially developed for handling cement and has a number of important advantages that render it particularly desirable for this purpose.

Various situations requiring oil well cementing operations are known to those familiar with the art, and hence need not be discussed further than to state that in practically all instances in which the cement is to be deposited in the well by the use of a dump bucket or bailer, it is most desirable that it be possible to accurately discharge the cement at the particular point where it is required, and to do so without excessive dilution of the cement charge with well fluid. For a full appreciation of the merits of the present bailer, brief reference may be made to a number of difficulties that have been encountered in the use of other bailers, and the resultant failure to place the cement at exactly the proper location in desirable undiluted condition. For this purpose we may assume a typical operation in which the bailer is to be lowered within the well a number of times to deposit successive charges of cement, one on top the others.

One of the first difficulties ordinarily encountered is that of obtaining a complete and rapidly continuous discharge of cement from the bailer. For example, in that type of bailer operating to dump the cement charge as the bailer is elevated in the well, frequently the discharge of cement is interfered with or misdirected by reason of obstructions in the outlet passage of the bailer, or for other reasons such as the particular location of the cement outlet, so that instead of being deposited rapidly and in a homogeneous body, the cement is "strung out" within the column of well fluid. The result is an inability to place all the cement in a homogeneous body at the place desired, and excessive dilution of the cement and impairment of its setting properties. As indicated, this difficulty usually is due to the bailer parts, such as the cement discharge passage and its closure or valve, being so constructed or arranged that the cement tends to bridge across relatively restricted areas and interfere with its prompt discharge. Similar difficulties are encountered in the use of so-called bottom dump bailers which operate to release the cement charge by contact with the bottom of the hole, in that sand or formation may clog the bailer discharge opening at least to the extent of so restricting the passage that the cement cannot be fully and rapidly released.

One of my principal objects is to provide a bailer which, upon opening of the closure, permits free and unobstructed passage of the cement into the well. To accomplish this purpose, I preferably provide a substantially cylindric straight bore within the body to form the charge containing chamber and a discharge passage extending to the point of final discharge at the bottom of the bailer. I also use a type of closure which, when open, leaves the discharge passage substantially unobstructed. As an additional feature of importance, I construct the bailer so that the final cement discharge opening may be lowered immediately above and in direct proximity to a surface, for example on a preceding freshly deposited body of cement, on which the cement is to be deposited, without requiring support for the bailer upon or below that surface. This object of the invention is accomplished by providing a closure opening or releasing mechanism that is caused to operate by maintaining frictional contact between the wall of the well and parts of that mechanism, and by positioning the well contacting parts above the cement discharge opening at the lower end of the bailer. Thus, the discharge opening may be lowered and accurately positioned with reference to a predetermined location at which it is desired to deposit the cement, without possible interference since there may be no parts of the bailer extending below the discharge opening.

All the various features and objects of the invention will be more fully understood and explained to best advantage from the following detailed description of the invention in certain of its typical and illustrative forms as shown in the accompanying drawings, in which:

Fig. 4 shows a variational form of the invention in longitudinal section;

Figures 1, 2, 3:
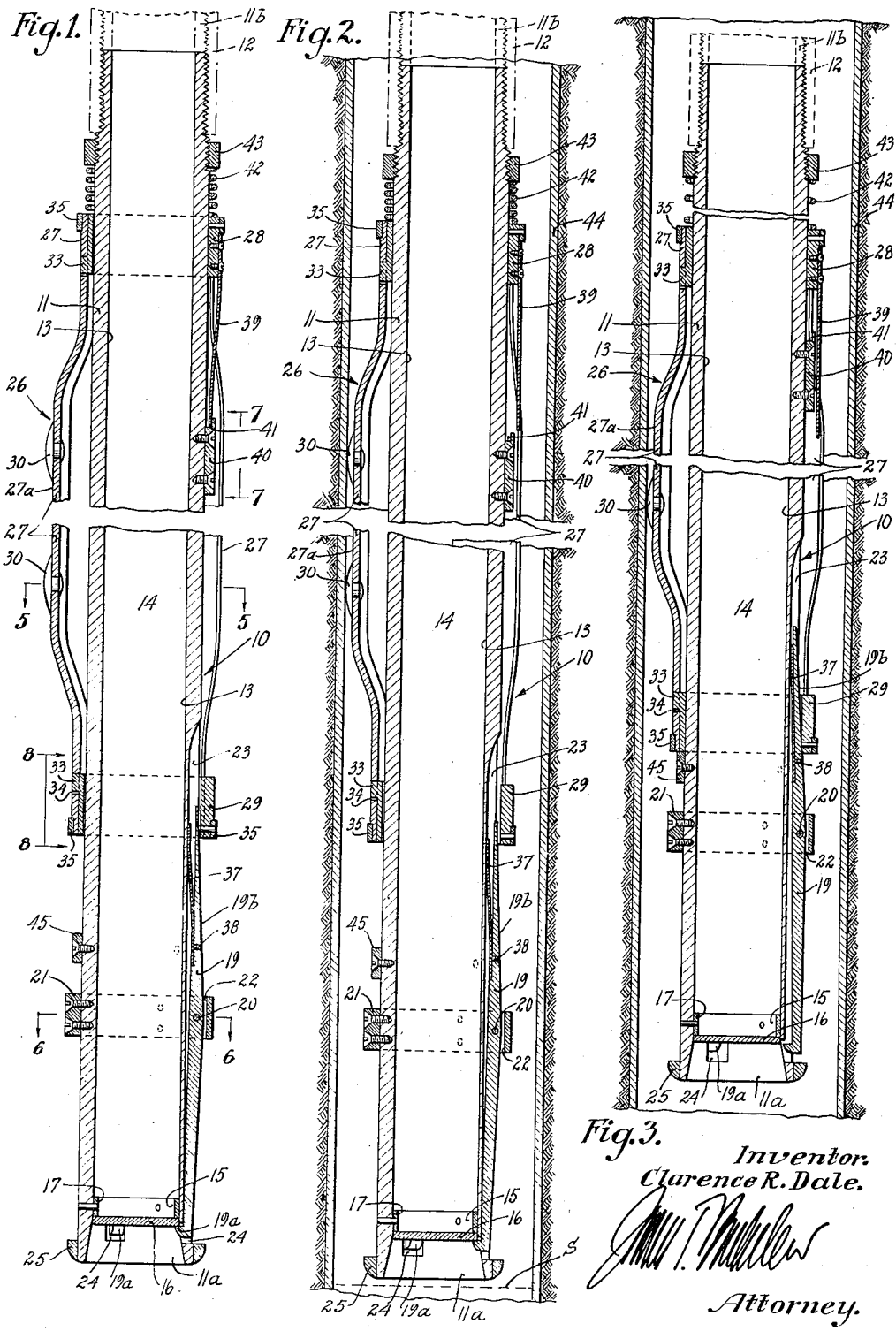
Fig. 1 is a longitudinal sectional view showing a preferred form of the invention.
Figs. 2 and 3 are views similar to Fig. 1, showing certain parts of the bailer in changed position as they occur in the operating sequence.

Figs. 5 and 6 are cross sections taken on lines 5—5 and 6—6 of Fig. 1;

Figs. 7 and 8 are fragmentary side elevations of certain of the parts as indicated by lines 7—7 and 8—8 of Fig. 1; and Fig. 9 shows a variational form of closure seat at the lower end of the body.

Referring first to Figs. 1 to 3 showing the bailer bottom parts, the body, generally indicated at 10, comprises an elongated tube 11, the upper end of which is connected by coupling 12 or in any other suitable manner with a tubular extension or continuation 11b of the body. As will be understood, the bailer is lowered in the well on a suitable suspension means, not shown, such as a wire cable. The body 11 preferably has a straight cylindric bore 13 defining the fluid containing chamber 14, which, upon opening of the later described closure, permits immediate and unobstructed discharge of cement from the lower end 11a of the body as the bailer is elevated. For reasons that will later appear, the bottom of chamber 14 is closed at a point at or near the lower end of the body, and I preferably employ a form of closure which, when opened, leaves the outlet 15 through which cement is discharged from the chamber, substantially entirely open and unobstructed. While in certain aspects of the invention, various types of closures answering to this description may be employed, I preferably use a form of closure which, when opened or released, may be dropped free of the body into the well. Thus I may employ a disk 16 which may be formed of any suitable material, for example Bakelite or other friable material that may easily be disintegrated by a drill, and which normally seats upwardly against a ring 17 secured to the body and sufficiently thin to provide an outlet 15 whose diameter corresponds substantially to that of the body bore, so that the seat shows no appreciable obstruction. If desired, and as illustrated in Fig. 9, the closure 16 may seat against an annular downwardly facing shoulder 18 formed by counterboring the lower end of the body, thus removing any obstruction whatever from the body bore.

The closure 16 is releasably held against its seat by a suitable latch mechanism, which for example may comprise a plurality of latch elements in the form of levers 19 pivotally mounted at 20 intermediate their ends within a ring 21 attached to the body, the ring being interiorly slotted at 22 to receive the levers. Each of the levers is contained within a longitudinal body groove 23, the lower disk engaging end 19a of the levers projecting inwardly through slots 24 formed in the body. As illustrated, a curved surface flange 25 may be applied to the lower end of the body to facilitate passing any obstructions that the body may encounter in its descent within in the well.

Operation of the latch elements 19 is controlled by vertical movement of the body 11 with relation to a body carried assembly, generally indicated at 26, that is maintained in frictional contact with the wall of the well and so associated with the latch mechanism that the latter is caused to release the closure disk upon withdrawal movement of the body. In its preferred form, the assembly 26 comprises a plurality of bowed springs 27 terminally applied to a pair of spaced sleeves 28 and 29 movable longitudinally of the body. Springs 27 preferably have noduled projections or studs 30 that provide localized points of contact with the well pipe and thereby prevent frictional wear along the entire outer surfaces 27a of the springs. In accordance with the invention, I attach the ends of the springs to sleeves 28 and 29 by connections that will permit full flexure of the springs to their ends and yet securely fasten the springs to the slips. As best illustrated in Fig. 8, the springs are received within vertical grooves 32 in the outer faces of the sleeves, and are held against vertical movement relative thereto by lugs 33 projecting outwardly within slots 34 in the springs. The latter are confined within grooves 32 by rings 35 fastened to the sleeves and bridging the grooves at the ends of the springs. In order to permit full radial flexing movement of the springs within the sleeve grooves, the end portions of the springs confined by rings 35 may be beveled or tapered as indicated at 36.

Normally, the upper ends of the latch levers 19 are received within the lower sleeve 29 in the position shown in Fig. 1, and the latch levers are yieldably held in retaining engagement with the disk 16 by leaf springs 37 attached at 38 to the levers and bearing against bases of body grooves 23. The spring and sleeve assembly 26 is releasably locked against downward movement with relation to the body and latch levers 19 by a pair of spring members 39, one only being shown, depending from and attached to sleeve 28 at opposite sides thereof. In the position of the parts shown in Fig. 1, the lower ends of springs 39 are received within the upper grooved end of segmental keepers 40 secured to the outer surface of the body. It will be understood of course that the lock springs 39 are arranged in suitable spaced and offset positions relative to the bowed springs 27. The lock springs are releasably thrust into the keeper grooves 41 to maintain the spring and sleeve assembly 26 in a predetermined upper position with relation to the body and latch levers, by a coil spring 42 confined between the upper end of sleeve 28 and an adjustable nut 43 threaded on the body. In this manner, relative movement between the body and friction spring assembly in a closure releasing direction is prevented until the lock springs 39 have become released from keepers 40, as will presently appear.

The bailer is capable of control and operation to dump its cement charge at any accurately determinable point in the well. In order to demonstrate more clearly certain additional advantages that the bailer has in depositing successive batches of cement in the well, it may be assumed in describing the operation, that the bailer is being lowered to dump a second cement charge directly on top of a previously introduced charge of cement that has not as yet taken its initial set. First, the bailer with its cement charge is lowered into the well or casing with the bailer parts set in the position shown in Fig. 1. Upon insertion within the well pipe 44, see Fig. 2, springs 27 may become radially contracted to an extent that will displace sleeve 28 upwardly against the resistance of spring 42 sufficiently to withdraw the lower ends of the lock springs 39 from grooves 41, whereupon the springs deflect outwardly by their resiliency to release the body for subsequent upward movement relative to the spring and sleeve assembly. In some situations, as where cement charge is to be dumped within a liner of smaller diameter than the casing, the casing size may be such that springs 27 will not become contracted sufficiently to release lock springs 39 until springs 27 are thrust into the liner, in which event the bailer will descend in the casing with the parts in the positions of Fig. 1.

The bailer is lowered to the depth at which the charge is to be dumped within the casing or liner, as the case may be, and the lower end 11a of the body may be lowered to a point immediately above the surface S of the previously deposited batch of cement. This is made possible by reason of the fact that the casing engaging parts of the bailer are positioned above the final point of cement discharge from the body, and therefore no interference with downward movement of the bailer outlet to the exact location at which the charge is to be dumped, is possible by reason, for example, of the previously deposited cement having become hardened at or below the surface S.

The cement charge is dumped by elevating the body 11 from the position of Fig. 2 and thereby causing sleeve 29 to cam the latch levers outwardly to disk releasing positions as the inclined lever surfaces 19b are thrust upwardly within the sleeve. The latter of course is held against upward movement by reason of the engagement of springs 27 with the well pipe. When released, the disk 16 is dropped through the lower end of the body entirely free of the bailer, so that the outlet 15 is fully opened for the unobstructed discharge of cement from chamber 14 from the lower end of the body as the latter is progressively elevated. As illustrated in Fig. 3, upward movement of the body relative to the spring and sleeve assembly 26 is limited by the engagement of stop 45 with the lower sleeve 29. The cement thus is dumped in direct proximity to the surface S, and by reason of the open and unobstructed discharge passage, in a homogeneous body undiluted to any serious extent by well fluid that may be standing in the pipe 44.

The bailer also may be used to carry out cementing operations in an unlined well bore, that is before insertion of the casing or pipe, in which event it may be desirable to modify the bailer as shown in Fig. 4, primarily to provide a different form of means for yieldably engaging the bore wall that is better adaptable to the increased diameter. In this form the entire spring and sleeve assembly 26 of Figs. 1 to 3 may be replaced by suitable radially projecting and resiliently flexible means applied to the latch control sleeve 50. For example, circularly arranged, stiff wire bristles 51 may be set into or otherwise mounted in the sleeve 50, the radial extent of the bristles being such that they will frictionally engage the bore wall 52 to the extent that as the body 53 is elevated, the latch levers 54 will be thrust upwardly into the sleeve and caused to release the disk closure 55 in the manner previously explained. In the form of Fig. 4, upward movement of the sleeve 50 relative to the body and latch levers is yieldably resisted by coil spring 56 confined between the sleeve and ring 57 secured to the body.

I claim:

1. In a fluid dump bailer for use in wells, a body comprising a tubular fluid containing chamber having an outlet at the lower end of said body through which the fluid is discharged straight downwardly into the well, a closure for said outlet and movable with relation thereto to permit unobstructed discharge of fluid from said chamber into the well, and means outside said chamber releasably holding said closure in closed position, said means including means at all times frictionally engaging the well bore wall above the point at which the fluid finally is discharged from the bailer into the well.

2. In a fluid dump bailer for use in wells, a body comprising a tubular fluid containing chamber having an unobstructed substantially cylindric bore extending to an outlet at the lower end of said body through which the fluid is discharged straight downwardly into the well, a closure for said outlet and movable with relation thereto to permit unobstructed discharge of fluid from said chamber into the well, and means outside said chamber releasably holding said closure in closed position, said means including means at all times frictionally engaging the well bore wall above the point at which the fluid finally is discharged from the bailer into the well.

3. In a fluid dump bailer for use in wells, a body comprising a tubular fluid containing chamber having an outlet at the lower end of said body through which the fluid is discharged straight downwardly into the well, a closure for said outlet and movable with relation thereto to permit unobstructed discharge of fluid from said chamber into the well, and means outside said chamber releasably holding said closure in closed position, said means including yielding means frictionally and continuously engaging the well bore wall above the point at which the fluid finally is discharged from the bailer into the well, and the holding means being releasable to open said closure by upward movement of the body relative to said yielding means while said yielding means remains in engagement with the bore wall.

4. In a fluid dump bailer for use in wells, a body comprising a tubular fluid containing chamber having an outlet at the lower end of said body through which the fluid is discharged straight downwardly into the well, a closure for said outlet and movable with relation thereto to permit unobstructed discharge of fluid from said chamber into the well, and movable means mounted outside said chamber for releasably holding said closure in closed position, said means including means frictionally engaging the well bore wall above the point at which the fluid finally is discharged from the bailer into the well, and the holding means being releasable to open said closure independently of bottom support for the bailer.

5. In a fluid dump bailer for use in wells, a body comprising a tubular fluid containing chamber having an outlet at the lower end of said body through which the fluid is discharged straight downwardly into the well, a closure for said outlet and movable with relation thereto to permit unobstructed discharge of fluid from said chamber into the well, a latch member mounted on the body outside said chamber and releasably holding said closure in closed position, and yielding means frictionally engaging the wall of the well above the lower end of the bailer, said latch member being operable to open said closure upon upward movement of the body relative to said yielding means.

6. In a fluid dump bailer for use in wells, a body comprising a tubular fluid containing chamber having an outlet at the lower end of said body through which the fluid is discharged straight downwardly into the well, a closure for said outlet and movable with relation thereto to permit unobstructed discharge of fluid from said chamber into the well, a latch member mounted on the body and releasably holding said closure in closed position, a sleeve cooperating with said latch member and movable longitudinally of the body, and yielding means applied to said sleeve and engageable with the wall of the well above said outlet so that the outlet may be brought directly above a surface on which the fluid is to be discharged, said sleeve being operable to actuate said latch member to open the closure upon upward movement of the body relative to said yielding means.

7. In a fluid dump bailer for use in wells, a body comprising a tubular fluid containing chamber having an outlet at the lower end of said body, a closure for said outlet and movable with relation thereto to permit unobstructed discharge of fluid from said chamber into the well, a latch member mounted on the body and releasably holding said closure in closed position, a sleeve cooperating with said latch member and movable longitudinally of the body, locking means releasably holding said sleeve against downward movement relative to the body, and yielding means applied to said sleeve and adapted to frictionally engage the wall of the well above said outlet, said locking means being releasable by inward deflection of said yielding means and said sleeve being operable to actuate said latch member to open the closure upon upward movement of the body relative to said yielding means.

8. In a fluid dump bailer for use in wells, a body comprising a tubular fluid containing chamber having an outlet at the lower end of said body, a closure for said outlet and movable with relation thereto to permit unobstructed discharge of fluid from said chamber into the well, a plurality of latch members mounted on the body and releasably holding said closure in closed position, and yielding means adapted to frictionally engage the wall of the well above said outlet so that said outlet may be brought directly above a surface on which the fluid is to be discharged, said body being movable relative to said yielding means and the latch members being operable by virtue of such relative movement to release and drop said closure into the well free from the bailer, upon upward movement of the body relative to said yielding means.

9. In a fluid dump bailer for use in wells, a body comprising a tubular fluid containing chamber having an outlet at the lower end of said body, a closure for said outlet and movable with relation thereto to permit unobstructed discharge of fluid from said chamber into the well, a plurality of latch members mounted on the body and releasably holding said closure in closed position, a sleeve cooperating with said latch members and movable longitudinally of the body, yielding means applied to said sleeve and adapted to frictionally engage the wall of the well above said outlet so that said outlet may be brought directly above a surface on which the fluid is to be discharged, said latch member being operable by said sleeve to release and drop said closure into the well free from the bailer, upon upward movement of the body relative to said yielding means.

10. In a fluid dump bailer for use in wells, a body comprising a tubular fluid containing chamber having an outlet at the lower end of said body, a closure for said outlet and movable with relation thereto to permit unobstructed discharge of fluid from said chamber into the well, a plurality of latch members mounted on the body and releasably holding said closure in closed position, a pair of spaced sleeves movable longitudinally of the body, one of said sleeves cooperating with said latch members, bowed springs applied to said sleeves and adapted to frictionally engage the wall of the well above said outlet so that said outlet may be brought directly above a surface on which the fluid is to be discharged, said latch members being operable by said co-operating sleeve to release and drop said closure into the well free from the bailer, upon upward movement of the body relative to said yielding means.

11. In a fluid dump bailer for use in wells, a body comprising a fluid containing chamber, a disc normally closing the lower end of said chamber, a plurality of radially movable latch elements engaging and supporting the disc, and means controlling said latch elements and including a member frictionally engaging the wall of the well above the lower end of the body, whereby the disc is bodily releasable into the well free from connection with the bailer by upward movement of said body.

12. In a fluid dump bailer adapted to be operated in an unlined well bore, a body comprising a fluid chamber having a discharge opening, a closure for said opening, means releasably holding said closure in closed position, said means including a circular arrangement of radially extending stiff metallic bristles movable vertically relative to the body and terminally engaging the wall of the well continuously throughout fluid dumping operation of the bailer, and said holding means being releasable to open said closure by vertical movement of the body relative to said bristles.

13. In an oil well tool adapted to be operated in an unlined well bore, the combination comprising a body, an element movable from its normal position relative to said body, holding means for releasably holding said element in said position, said holding means including a circular arrangement for radially extending stiff metallic bristles movable vertically relative to the body and terminally engaging the wall of the well, said element being releasable from said holding means by upward movement of the body relative to said bristles.

14. In a fluid dump bailer adapted to be operated in an unlined well bore, a body comprising a fluid chamber having a discharge opening, a closure for sad opening, means releasably holding said closure in closed position, said means including a plurality of substantially straight radially projecting and resiliently flexible fingers mounted at the outside of said body and movable vertically relative thereto, said fingers terminally engaging the wall of the well continuously throughout fluid dumping operation of the bailer, and said holding means being releasable to open said closure by vertical movement of the body relative to said fingers.

15. In an oil well tool adapted to be operated in an unlined well bore, the combination comprising a body, an element movable from its normal position relative to said body, holding means for releasably holding said element in said position, said holding means including a plurality of radially projecting and substantially straight resiliently flexible fingers terminally engaging the wall of the well continuously throughout movement of said element relative to the body, and means supporting said fingers for vertical movement relative to the body, said element being releasable from the holding means upon vertical movement of the body relative to said fingers.

16. In a fluid dump bailer adapted to be used for depositing fluid on a bottom surface in a well, a body comprising a fluid chamber having a discharge opening at its lower end, a closure for said chamber, movable means normally holding said closure in closed position, and means at the outside of said body and movable downwardly relative thereto to release said holding means, said means at the outside of the body comprising resilient members engaging the wall of the well above the lower end of the body so that said holding means is releasable to open said closure by upward movement of the body when said discharge opening is brought immediately above said surface, said resilient means remaining in engagement with the wall of the well and the bailer being unsupported on or below said surface during dumping of the bailer.

17. In a fluid dump bailer adapted to be used for depositing fluid on a bottom surface in a well, a body comprising a fluid chamber having a discharge opening at its lower end, a closure for said chamber, radially movable means normally holding said closure in closed position, and means at the outside of said body and movable downwardly relative thereto to release said holding means, said means at the outside of the body comprising resilient members engaging the wall of the well above the lower end of the body so that said holding means is positively moved radially outward by upward movement of the body and thereby released to open said closure when said discharge opening is brought immediately above said surface, said resilient means remaining in engagement with the wall of the well and the bailer being unsupported on or below said surface during dumping of the bailer.

18. In a fluid dump bailer adapted to be used for depositing fluid on a bottom surface in a well, a body comprising a fluid chamber having a discharge opening at its lower end, a closure for said chamber, radially movable means normally holding said closure in closed position, and means at the outside of said body and movable downwardly relative thereto to release said holding means, said means at the outside of the body comprising resilient members engaging the wall of the well above the lower end of the body, said holding means being positively movable radially outward by upward movement of the body to drop said closure entirely free from the body.

CLARENCE R. DALE.

---

CERTIFICATE OF CORRECTION.

Patent No. 2,155,785.                  April 25, 1939.

CLARENCE R. DALE.

It is hereby certified that error appears in the printed specification of the above numbered patent requiring correction as follows: Page 4, first column, line 55, claim 9, for "member" read members; same page, second column, line 35, claim 13, for the word "for" read of; and that the said Letters Patent should be read with this correction therein that the same may conform to the record of the case in the Patent Office.

Signed and sealed this 30th day of May, A. D. 1939.

Henry Van Arsdale (Seal)                          Acting Commissioner of Patents.